United States Patent
Craig et al.

(10) Patent No.: US 10,901,793 B2
(45) Date of Patent: Jan. 26, 2021

(54) DETERMINING WHETHER TO PROCESS A HOST REQUEST USING A MACHINE LEARNING MODULE

(71) Applicant: INTERNATIONAL BUSINESS MACHINES CORPORATION, Armonk, NY (US)

(72) Inventors: Matthew R. Craig, Sahuarita, AZ (US); Beth A. Peterson, Tucson, AZ (US); Lokesh M. Gupta, Tucson, AZ (US); Kevin J. Ash, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 16/255,813

(22) Filed: Jan. 23, 2019

(65) Prior Publication Data

US 2020/0233716 A1    Jul. 23, 2020

(51) Int. Cl.
*G06F 9/50* (2006.01)
*G06N 20/00* (2019.01)

(52) U.S. Cl.
CPC ........... *G06F 9/5038* (2013.01); *G06N 20/00* (2019.01)

(58) Field of Classification Search
CPC ....... G05B 13/042; G05B 13/20; G06F 3/061; G06F 3/0653; G06F 3/0659; G06F 9/5038; H04L 47/741; H04L 47/823
See application file for complete search history.

(56) References Cited

U.S. PATENT DOCUMENTS

| | | | | |
|---|---|---|---|---|
| 7,444,272 | B2* | 10/2008 | Alvarez | G05B 13/042 703/2 |
| 8,863,266 | B1* | 10/2014 | Sanyal | H04L 67/42 726/9 |
| 9,760,402 | B2* | 9/2017 | Shows | G06F 1/329 |
| 10,303,492 | B1* | 5/2019 | Wagner | G06F 8/41 |
| 10,555,145 | B1* | 2/2020 | Siddiqui | H04W 4/50 |
| 2017/0371544 | A1 | 12/2017 | Choi et al. | |

OTHER PUBLICATIONS

Panda, P. et al., "Conditional Deep Learning for Energy-Efficient and Enhanced Pattern Recognition", EDAA, 2016, pp. 6.
Yang, R. et al., "Intelligent Resource Scheduling at Scale: a Machine Learning Perspective", University of Leeds, 2018, pp. 11.
Caglar, F, "Dynamic Resource Management in Resource-Overbooked Cloud Data Centers", Vanderbilt University, Aug. 2015, pp. 140.

(Continued)

*Primary Examiner* — Dong U Kim
(74) *Attorney, Agent, or Firm* — David W. Victor; Konrad Raynes Davda & Victor LLP (57) ABSTRACT

Provided are a computer program product, system, and method for determining whether to process a host request using a machine learning module. Information that relates to at least one of running tasks, mail queue messages related to host requests, Input/Output (I/O) request processing, and a host request received from the host system is provided to a machine learning module. An output representing a processing load in a system is received from the machine learning module. The output is used to determine whether to process the host request.

18 Claims, 7 Drawing Sheets

(56) References Cited

OTHER PUBLICATIONS

"Method and System for Environment Aware Maintenance Task Optimization based on Machine Learning", IP.com, Prior Art Database Technical Disclosure, IP.com No. IPCOM000250426D, Jul. 13, 2017, pp. 5.

"Automatically Scaling Multi-Tenant Machine Learning", IP.com, Prior Art Database Technical Disclosure, IP.com No. IPCOM000252098D, Dec. 15, 2017, pp. 35.

U.S. Appl. No. 16/255,816, filed Jan. 23, 2019.

List of IBM Patents and Applications treated as related dated Jan. 24, 2019 pp. 2.

\* cited by examiner

Input Information

FIG. 3

Host Request

FIG. 4

Operating Parameters

DETERMINING WHETHER TO PROCESS A HOST REQUEST USING A MACHINE LEARNING MODULE

BACKGROUND OF THE INVENTION

1. Field of the Invention

The present invention relates to a computer program product, system, and method for determining whether to process a host request using a machine learning module.

2. Description of the Related Art

A storage controller manages access to a storage configured as a Redundant Array of Independent Disks (RAID) array having a plurality of RAID ranks. A storage controller may include redundant components, such as device adaptors, host adaptors, and processing nodes. The processing nodes may receive Input/Output ("I/O") requests from multiple host systems on different channel paths assigned to the host systems. A channel path comprises a division or allocation of resources in the storage controller, including host adaptor and processing node resources. A processing node receiving a host request may consider a number of available tasks in the processing node to determine whether to accept and process the host request or return busy if the number of available tasks falls below a lower limit.

There is a need in the art for improved techniques to determine whether to process host requests.

SUMMARY

Provided are a computer program product, system, and method for determining whether to process a host request using a machine learning module. Information that relates to at least one of running tasks, mail queue messages related to host requests, Input/Output (I/O) request processing, and a host request received from the host system is provided to a machine learning module. An output representing a processing load in a system is received from the machine learning module. The output is used to determine whether to process the host request.

DETAILED DESCRIPTION

Prior art techniques that consider available tasks to determine whether to allocate a task to a new host request may not consider numerous other factors that can determine whether a new host request can be processed without unduly taxing system resources. For instance, the number and type of pending tasks may play a role, the current processor resource usage, available tasks, depth of any mail queues, disconnected and re-driven host requests, as well as parameters of the host request, such as type of operation and priority, may also impact whether system conditions are suitable for accepting another host request.

Described embodiments provide improvements to computer technology for determining whether to accept a host request, such as an I/O request to storage, query, reserve command, or recovery operation, by providing information related to at least one of running tasks, mail queue messages related to host request processing, I/O request processing, and a host request received from the host system to a machine learning module to produce output representing a processing load in a system to determine whether to process the received host request. By using a multi-factor analysis, the machine learning module provides output highly reflective of current system operating load that may be used to determine whether to accept a host request, return busy to the request or accept the request and message the host to lower the rate at which host requests are sent to reduce processing burdens in the system.

Described embodiments further provide improved techniques to computer technology for retraining a machine learning module to produce output indicating whether to accept a host request that is optimized to maintain system resource types within optimum operating bounds by determining an expected output based on a measured system resource usage and an optimum system resource usage. The difference of the expected output usage and the actual machine learning module output may then be used to retrain the machine learning module to reduce this margin of error of expected output to ensure that the system resource types being considered are operating within optimum system resource usage parameters, such as processor resource usage and mail queue depth. In this way, the machine learning module is continually retrained to produce outputs indicating whether to accept a host request that optimizes key system resources, such as processor usage and mail queue depth of a mail queue queuing messages between the host systems and the storage controller.

Figure 1:
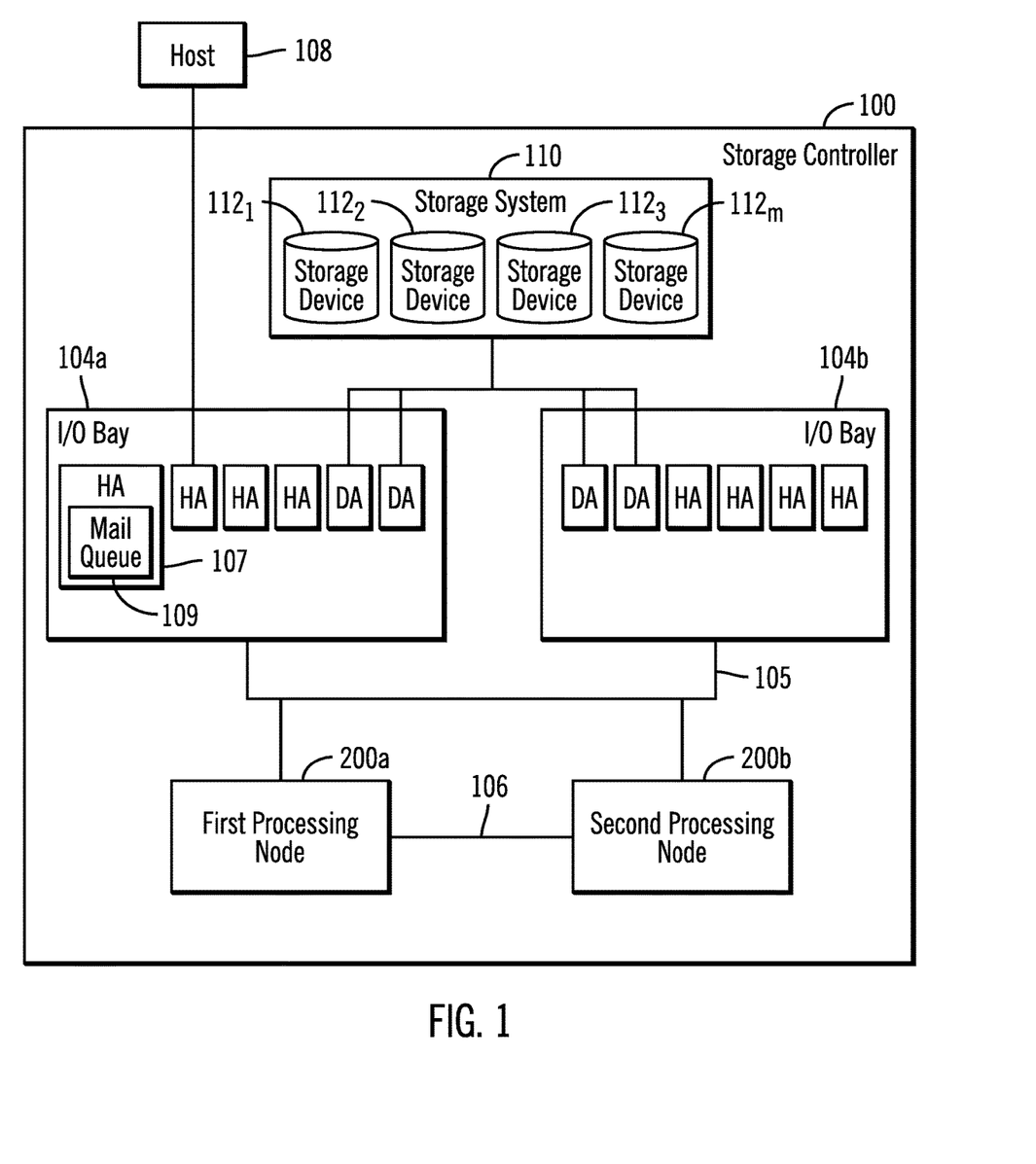
FIG. 1 illustrates an embodiment of a computing environment.

FIG. 1 illustrates an embodiment of a storage controller 100 including a plurality of independent processing nodes 200a, 200b, such as a central electronics complex (CEC), that each connect to Input/Output (I/O) bays 104a, 104b having device adaptors (DA) and host adaptors (HA) therein, over a bus interface 105, such as a Peripheral Component Interconnect Express (PCIe) bus. The processing nodes 200a, 200b may also communicate with each other directly over a link 106, such as a PCIe bus. Host systems, such as host 108, may connect to the storage controller 100 through a host adaptor (HA), such as host adaptor 107, in the I/O bays 104a, 104b. Each host adaptor 107 may include a mail queue 109 to queue messages between hosts 108 and the processing nodes 200a, 200b. The host adaptor 107 may have a separate mail queue 109 for each channel or host group on which host communicates to the processing nodes 200a, 200b.

A storage system 110 includes a plurality of storage devices $112_1 \ldots 112_m$ in which tracks, logical volumes, ranks of logical contiguous storage spaces, and storage arrays, such as Redundant Arrays of Independent Disks (RAID) may be configured. Each processing node 200a, 200b may be assigned one of the device adaptors in each of the I/O bays 104a, 104b that connect to the storage array 110 to provide access to data configured in the storage devices 112. Each processing node 200a, 200b has a default configuration to communicate with a device adaptor (DA) in one of the I/O bays 104a, 104b, where the default configuration will assign the different processing nodes 200a, 200b to device adaptors in the I/O bays 104a, 104b. Each processing node 200a, 200b may be assigned groups of the storage arrays configured in the storage devices $112_1 \ldots 112_m$.

In the embodiment of FIG. 1, two redundant processing nodes 200a, 200b and two I/O bays 104a, 104b are shown. In further embodiments, there may be more than the number of shown redundant elements 200a, 200b, 104a, 104b, to provide additional redundancy.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices $112_1 \ldots 112_m$ in the storage system 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices $112_1 \ldots 112_m$, such as Just a Bunch of Disks (JBOD), Direct Access Storage Device (DASD), Redundant Array of Independent Disks (RAID) array, virtualization device, etc. Further, the storage devices $112_1 \ldots 112_m$ in the array 110 may comprise heterogeneous storage devices from different vendors and different types of storage devices, such as a first type of storage devices, e.g., hard disk drives, that have a slower data transfer rate than a second type of storage devices, e.g., SSDs.

The components, such as the I/O managers 206, host adaptors (HA), and device adaptors (DA) may be implemented in computer readable program instructions in a computer readable storage medium executed by a processor and/or computer hardware, such as an Application Specific Integrated Circuit (ASIC).

Figure 2:
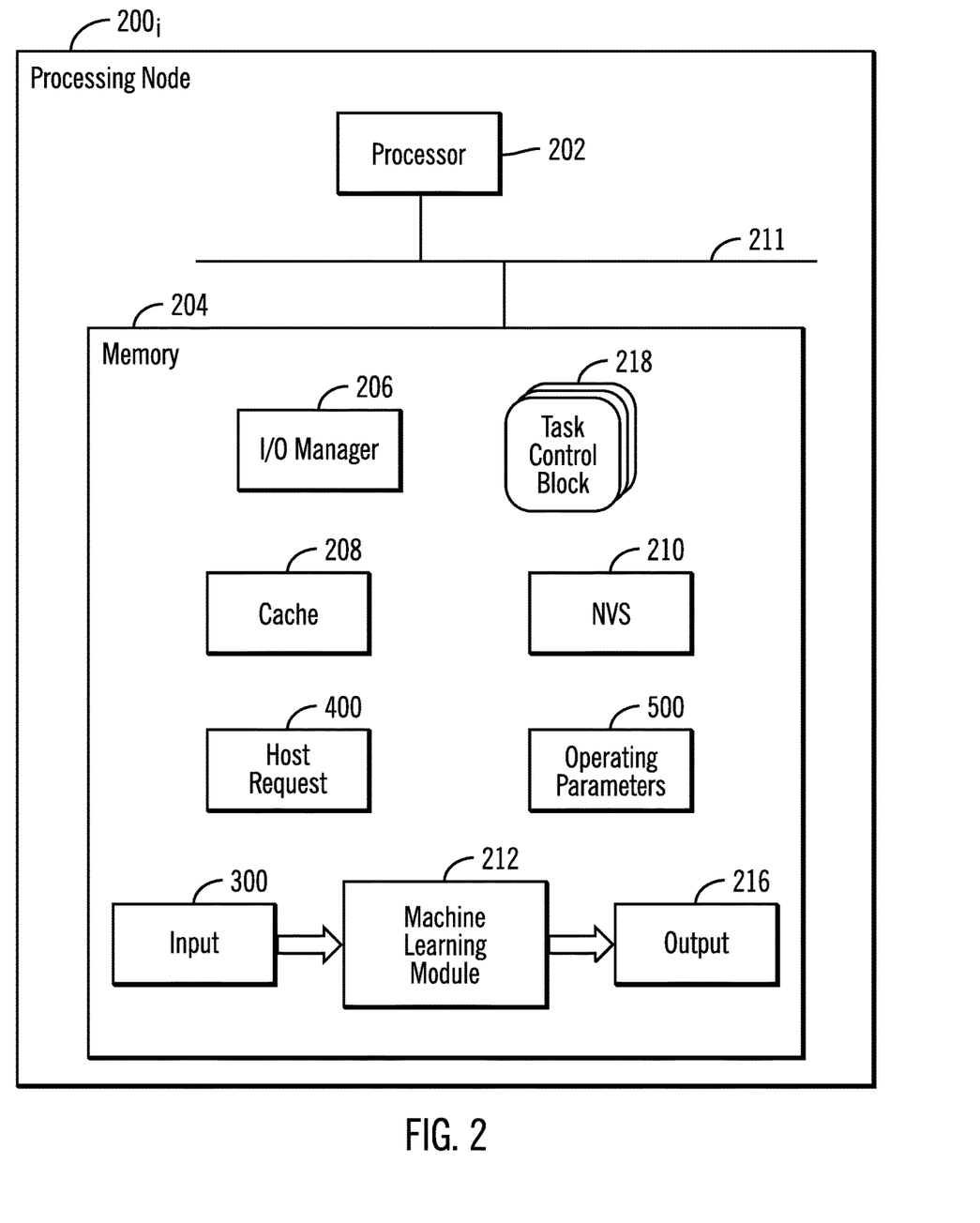
FIG. 2 illustrates an embodiment of a processing node.

FIG. 2 illustrates an embodiment of a processing node 200, such as one of the processing nodes 200a, 200b, including a processor 202, such as one or more processor devices, and a memory 204 having program code executed by the processor 202. The memory 204 includes an I/O manager 206 to manage requests from attached hosts 108 to storage arrays configured in the storage devices $112_1 \ldots 112_m$, and perform other related operations, such as path selection and error handling. The memory 204 includes a cache 208 to cache tracks from the storage devices $112_1 \ldots 112_m$ and a non-volatile storage ("NVS") 210 to provide a backup storage of modified tracks in the other cache 120b, 120a, respectively. The processor 202 and memory 204 communicate over a bus interface 211.

The memory 204 may comprise a suitable volatile or non-volatile memory devices, including those described above. The NVS 210 may comprise a suitable non-volatile memory device, such as a SSD, flash memory device, battery-backed up DRAM, RRAM, PCM, etc. Other non-volatile devices may be used for the non-volatile storage 210 such as a battery backed-up DIMM.

The I/O manager 206 maintains input information 300 including input information related to one or more of running tasks, mail queue messages related to host request processing, I/O request processing, and a host request received from the host system 108 and produces output for the received host request indicating whether to process the received host request. In the embodiment of FIG. 1, the mail queue 109 is maintained in the host adaptor 107. Alternatively, the message queue 109 may be maintained in the processing node $200_i$.

In the embodiment of FIG. 2, the memory includes one or more machine learning modules 212 that receive input information 300 and produces an output 216, such as a value between 0 and 1, indicating a degree to which the processing of the host request will cause the processor node $200_i$ to operate at less than optimal conditions. In one implementation, a relatively higher output 216 may indicate that the host I/O request will have a more negative impact on processing node $200_i$ performance than a relatively lower output 216 value. In other implementations, other relative value amounts may indicate high and low performance impact. The operating parameters 500 provide thresholds used to determine whether the output 216 indicates to assign a task 218 to the host request, return busy to the host request indicating the host request is being delayed and will not be processed or accept the host request and return a throttle command to the host to cause the host to reduce the rate at which it sends host requests to reduce burdens on the processor node $200_i$.

The machine learning module 212 implements a machine learning technique such as decision tree learning, association rule learning, artificial neural network, inductive programming logic, support vector machines, Bayesian models, etc., to determine the output value 216 indicating a degree to which processing the received host request 400 would negatively impact processor node $200_i$ performance In one embodiment, the machine learning modules 212 may comprise artificial neural network programs. In neural network implementations, weights and biases in a hidden layer of nodes would be assigned to these inputs to indicate their predictive quality in relation to other of the inputs based on training to reach desired output values for the queues for which the machine learning module 212 is producing outputs.

Each neural network may be trained using backward propagation to adjust weights and biases at nodes in a hidden layer to produce adjusted output values based on the provided input 300. A margin of error may be determined with respect to the actual output 216 from the machine learning module 212 and an expected output to train the machine learning module 212 to produce the desired output value based on a calculated expected output. In backward propagation, the margin of error of the output is measured and the weights and biases at nodes in the hidden layer are adjusted accordingly to decrease the error. Backward propagation may comprise an algorithm for supervised learning of artificial neural networks using gradient descent. Given an artificial neural network and an error function, the method may calculate the gradient of the error function with respect to the neural network's weights and biases.

The I/O manager 206 may generate a task control block 218 for a task assigned to process a host request 400. The host request 400 may comprise an I/O request to the storage 110, a query, reserve or recovery option.

The I/O manager 206 and machine learning modules 212 are shown in FIG. 2 as program code loaded into the memory 204 and executed by the processor 202. Alternatively, some or all of the functions may be implemented in hardware devices in the storage controller 100 external to the processor nodes 200a, 200b, such as in Application Specific Integrated Circuits (ASICs) or executed by separate dedicated processors.

Figure 3:
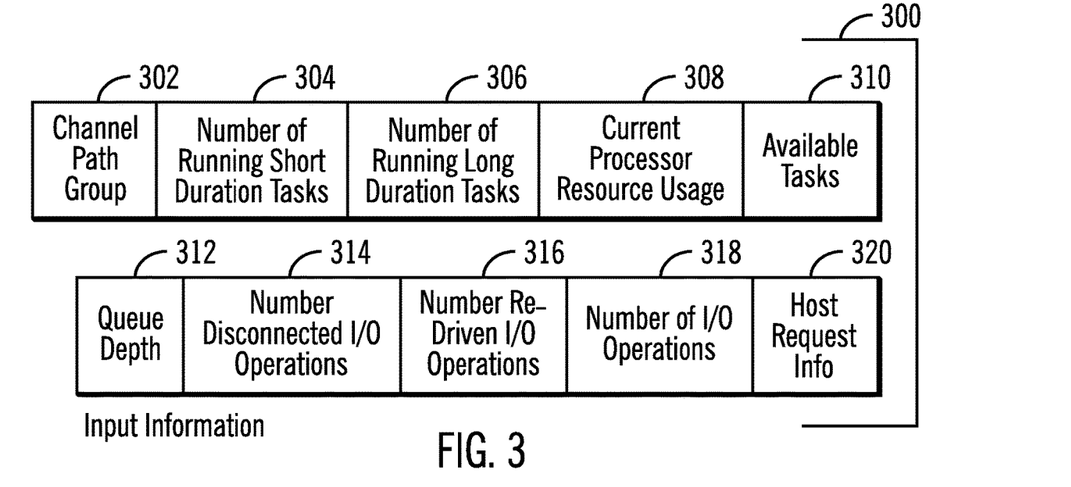
FIG. 3 illustrates an embodiment of input information to a machine learning module to produce an output indicating whether to accept a received host request.

FIG. 3 illustrates an embodiment of the input information 300 the I/O manager 206 gathers, including: a channel path group 302 for which the information is maintained, where there may be different instances of input information 300 for different channel path groups; a number of running short duration tasks 304, such as a query, reserve command, recovery operation, etc.; a number of long duration tasks 306, such as a read/write request; current processor resource usage 308 of the processor 202; a number of available tasks 310 that may be assigned by the processor 202; a queue depth 312 of the mail queue 109; a number of disconnected I/O operations comprising a number of times hosts 108 in the channel path group 302 have disconnected from a host request in the channel due to delay in receiving an acknowledgment of processing from the I/O manager 206; a number of re-driven I/O operations 316 comprising a number of times the hosts 108 in the channel path group 302 have re-driven an I/O operation after being disconnected; a number of I/O operations 318 to the channel path group 302; and host request information 320, such as host request information 400

Figure 4:
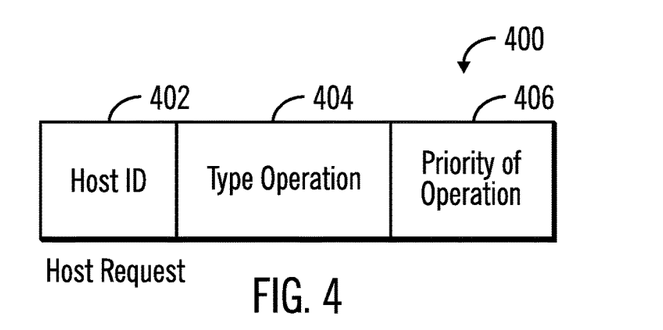
FIG. 4 illustrates an embodiment of a host request.

FIG. 4 illustrates an embodiment of a host request 400 including a host ID 402; a type of operation 404; and a priority of the operation 406. The host request 400 may further include op codes for a read/write operation, query, reserve, recovery operation, etc.

Figure 5:
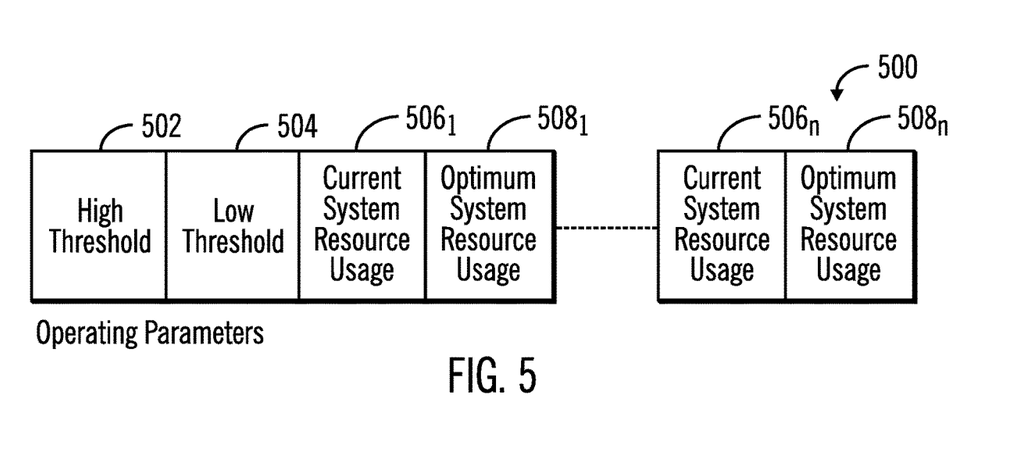
FIG. 5 illustrates an embodiment of operating parameters used to process the output from the machine learning module to determine whether to process the received host I/O request.

FIG. 5 illustrates an embodiment of operations of operating parameters 500 the I/O manager 206 uses to process output 216 from the machine learning module 212 to determine whether to process a received I/O request, and includes a high threshold 502, such that if the output 216 exceeds the high threshold 502, busy is returned to the host request; a low threshold 504, such that if the output 216 is below the low threshold 504, the host request is processed and if the output 216 is between the low 504 and high 502 thresholds, the host request is processed and a throttle command returned to the host 108 to cause the host 108 to lower the rate at which host requests 400 are transmitted to the controller 100; and one or more pairs of a current system resource usage $506_1 \ldots 506_n$ and optimum system resource usage $508_1 \ldots 508_n$ for one or more system resource usages that are considered to train the machine learning module 212. For instance, one system resource may comprise a processor 202 usage and another may comprise a mail queue 109 depth.

Figure 6:
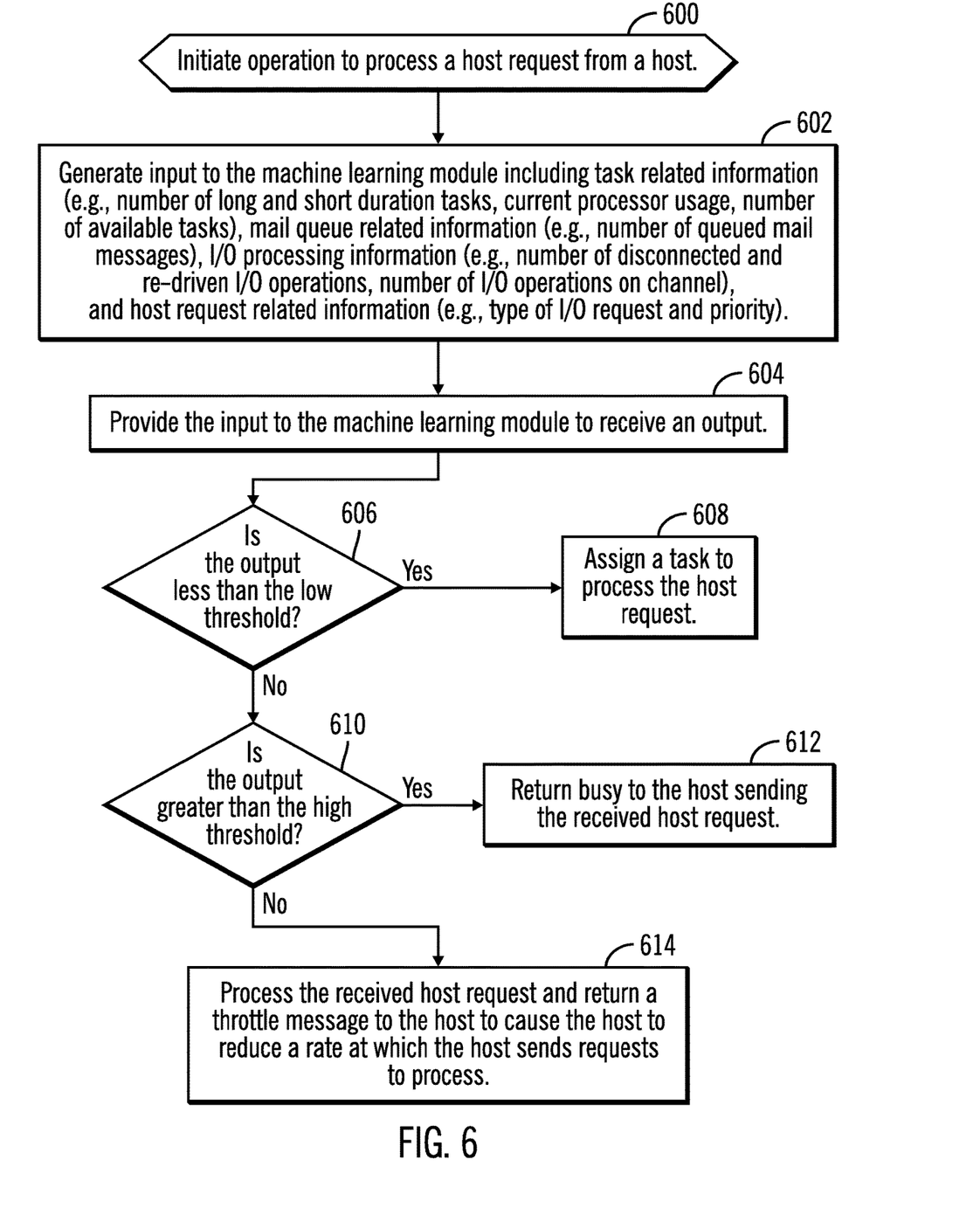
FIG. 6 illustrates an embodiment of operations to process a host request from a host to determine whether to accept and process or return busy to the host request.

FIG. 6 illustrates an embodiment of operations performed by the I/O manager 206 and the machine learning module 212 to process host requests. Upon initiating (at block 600) an operation to process a host request 400 from a host 108, the I/O manager 206 generates (at block 602) input 300 comprising task related information (e.g., number of short 304 and long 306 duration tasks, current processor usage 308, number of available tasks 310), mail queue related information (e.g., number of queued mail messages or queue depth 312), I/O processing information (e.g., number of disconnected 314 and re-driven 316 I/O operations, number of I/O operations 318 on channel), and host request related information 320 (e.g., type of I/O request 404 and priority 406). The I/O manager 206 provides (at block 604) the input 300 to the machine learning module 212 to receive an output 216 indicating a likelihood processing the I/O request cause substantial burdens to system performance.

If (at block 606) the output 216 is less than the low threshold 504, then the I/O manager 206 assigns (at block 608) a task 218 to the host request 400 to process. If (at block the output 216 is greater than the low threshold 504 and greater (at block 610) than the high threshold 502, then the I/O manager 206 returns (at block 612) busy to the host 108 sending the host request. If (at block 610) the output is less than, i.e., not greater, than the high threshold 502 and greater than the low threshold 504, then the I/O manager 206 processes (at block 614) the received host request 400 and returns a throttle message to the host 108 to cause the host to reduce a rate at which the host sends requests to process.

With the described embodiments, a machine learning module 212 implementing a machine learning algorithm is used to provide an output value 216 indicating an impact of processing a host request on system performance based on various parameters that impact performance. The performance optimized output may then be used to determine whether to process a host request, return busy or process the request and send a command to the host 108 to throttle further I/O requests. The described embodiments provide improvements over techniques that consider just the number of available tasks to assign, by considering numerous parameters that may impact whether an additional host request may be processed, such as task related information, mail message information, processing information, and host request information. By taking into account multiple factors in addition to available tasks, the I/O manager 206 will make a more optimal multi-factor based decision of whether to process a host request than a decision based on just a number of available tasks. For instance, more shorter duration tasks 304 than long duration tasks 306 may indicate a host request should be processed because shorter duration tasks are likely to complete soon and be released to provide more tasks 218. Other factors such as available tasks, queue depth, disconnected and re-driven operations may indicate whether a further host request may be processed without negatively impacting system resource usage.

Figure 7:
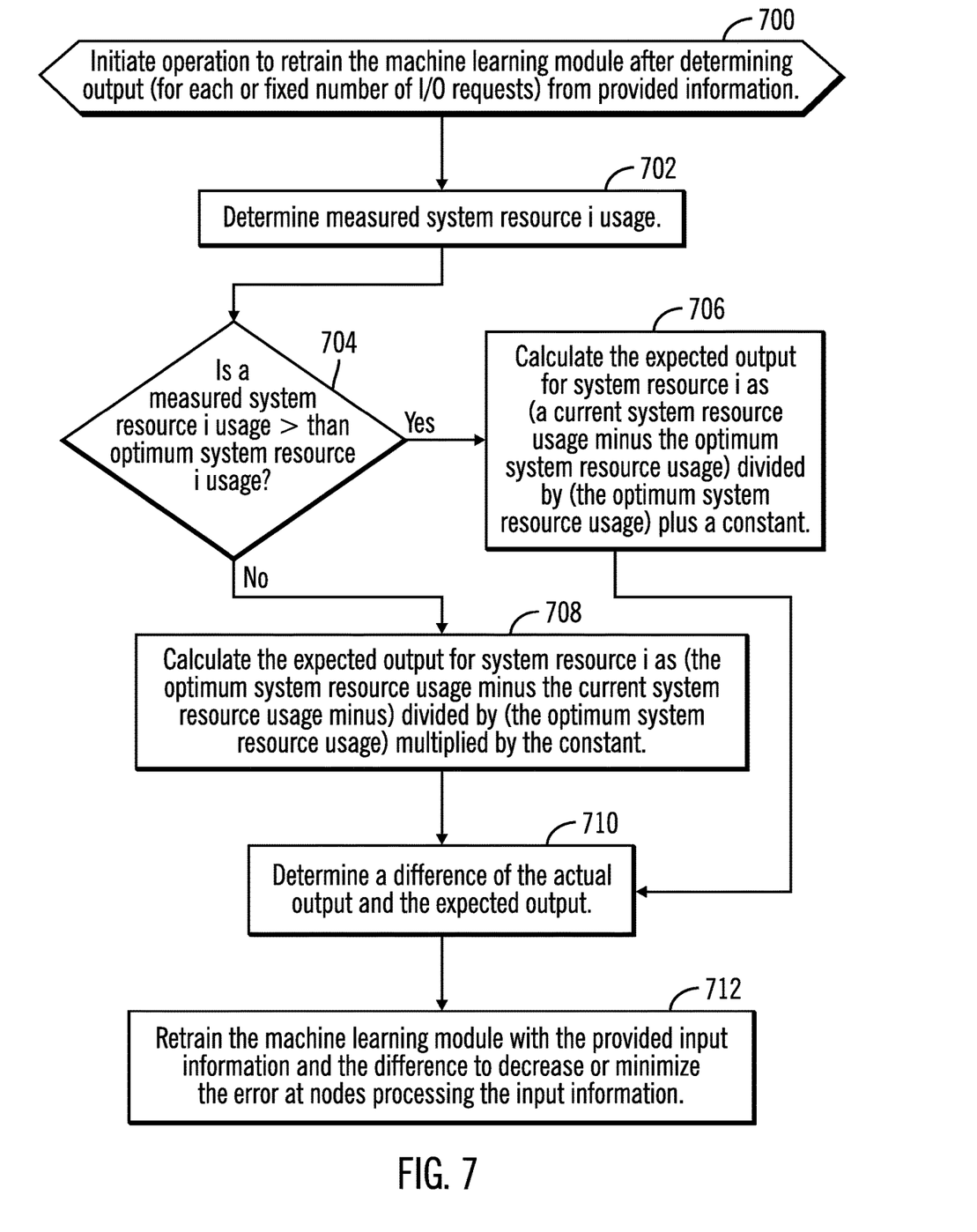
FIG. 7 illustrates an embodiment of operations to retrain a machine learning module to provide an output value used to optimize system resource parameters.

FIG. 7 illustrates an embodiment of operations performed by the I/O manager 206 to retrain the machine learning module 212. The machine learning module 212 may be retrained after determining an output 216 for a received host request 400 or may be retrained after considering whether to process a fixed number of host requests 400 to provide periodic retraining. Upon initiating (at block 700) an operation to retrain, the I/O manager 206 determines (at block 702) the measured or current system resource usage $506i$ for a system resource i. If (at block 704) the measured system resource i usage is greater than optimum system resource usage $508_i$ for the system resource being considered, then the I/O manager calculates (at block 706) the expected output for system resource i as (the current system resource usage $506_i$ minus the optimum system resource usage $508_i$) divided by (the optimum system resource usage $508_i$) plus a constant. In one embodiment, the constant may comprise the low threshold 504, or output 216 at which a received host request 400 is processed. If (at block 704) the measured system resource usage $506_i$ is less than or equal to the optimum system resource usage $508_i$ for a resource i being considered, then the I/O manager 206 calculates (at block 708) the expected output for system resource i as (the optimum system resource usage $508_i$ minus the current system resource usage $506_i$) divided by (the optimum system resource usage $506i$) and the result is then multiplied by the constant.

In an embodiment where the system resources comprise processor 202 usage and mail queue 109 depth, then if the processor usage is greater than an optimum processor usage, then the expected output is calculated as (a current processor 202 usage minus the optimum processor resource usage) divided by (the optimum processor resource usage) plus a constant. If the measured processor 202 resource usage is less than or equal to the optimum processor 202 resource usage, then the expected output is calculated as (the optimum processor 202 resource usage minus the current processor resource usage) divided by (the optimum processor 202 resource usage) multiplied by the constant.

For the mail queue 109 depth system resource, if the mail queue 109 depth is greater than an optimum mail queue depth, the expected output is calculated as (a current mail queue 109 depth minus the optimum mail queue depth) divided by (the optimum mail queue depth usage) plus a constant. If the current mail queue depth 109 is less than or equal to the optimum mail queue depth, then the expected output is calculated as (the optimum mail queue depth minus the current mail queue depth) divided by (the optimum mail queue depth) multiplied by the constant After calculating the expected output for system resource I, the I/O manager 206 determines (at block 710) a difference of the actual output 216 and the expected output, which difference indicates a margin of error. The machine learning module 212 may be retrained (at block 712) with the provided input information 300 and the difference to decrease or minimize the error at nodes processing the input information 300.

In embodiments where the machine learning module 212 comprises a neural network, the module 214 may comprise a collection of "neurons" with "synapses" connecting them that is organized into three main parts: the input layer, the hidden layer, and the output layer. The term "deep" learning implies multiple hidden layers not visible as a network output. Training such a neural network involves calibrating all of the "weights" by repeating two key steps, forward propagation and backward propagation. In forward propagation, a set of weights are applied to the input data 300 to calculate the output value 216. In backward propagation, the margin of error in the expected and actual outputs are measured and the weights are adjusted to decrease the error. Neural networks repeat both forward and backward propagation until the weights are calibrated to accurately produce the expected output, such as calculated at blocks 706 and 708 of FIG. 7, from the input 300 used to produce the current output value.

Figure 8:
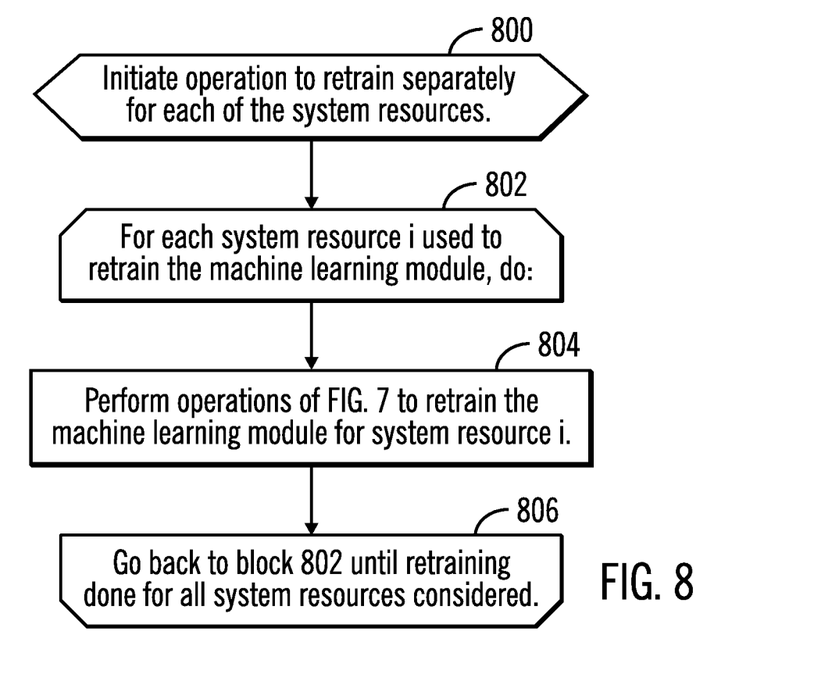
FIGS. 8 and 9 illustrate alternative embodiments of operations to retrain the machine learning module.

FIG. 8 illustrates an embodiment of operations to retrain the machine learning module 212 using the procedure of FIG. 7 to retrain separately for each considered system resource. Upon initiating (at block 800) the operation to retrain, which may be performed after receiving each host request or a fixed number of host requests, a loop of operations is performed at blocks 802 through 806 for each system resource i used to retrain the machine learning module, such as processor 202 usage or mail queue 109 depth 312. At block 804, the I/O manager 206 performs the operations of FIG. 7 to retrain the machine learning module for system resource i.

Figure 9:
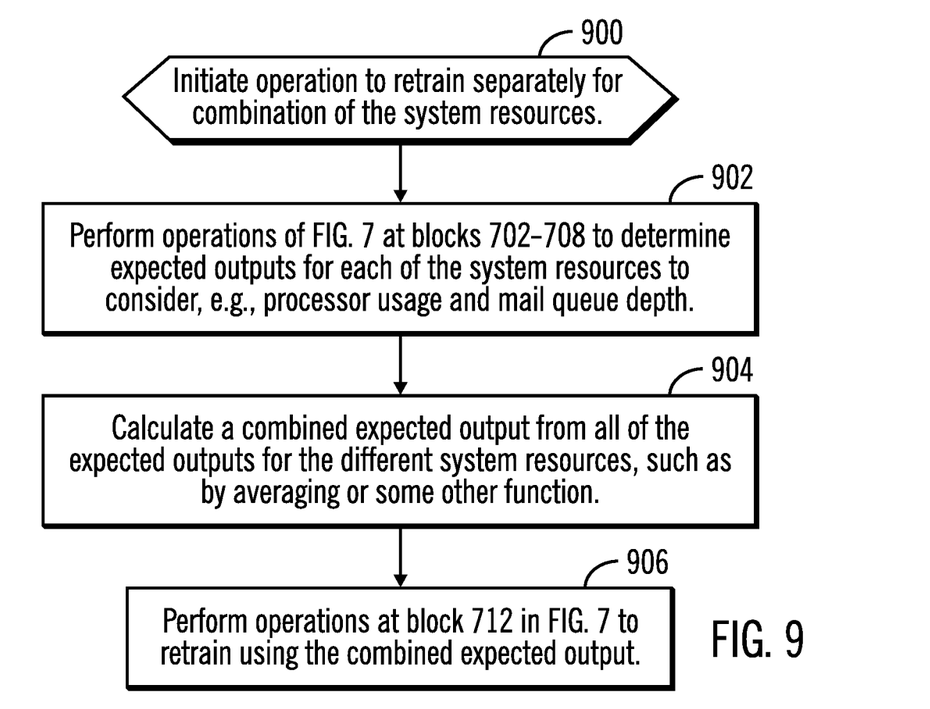

FIG. 9 illustrates an alternative embodiment of operations to retrain the machine learning module 212 using the procedure of FIG. 7. Upon initiating (at block 900) the operation to retrain, which may be performed after receiving each host request or a fixed number of host requests, the I/O manager 206 calculates (at block 904) a combined expected output from all of the calculated expected outputs for the different system resources, such as an average, weighted average or other combination function. The machine learning module 212 performs (at block 906) at block 712 in FIG. 7 the operation to retrain the machine learning module 212 using the combined expected output calculated at block 904.

With the embodiments of FIGS. 7-9, the machine learning module 212 is retrained based on margins of errors with respect to an expected output and actual output for different system resources to optimize the ability of the machine learning module to indicate whether to process a host request that ensures the controller 100 does not experience resource usage problems that can affect overall performance.

In the described embodiment, variables i and n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
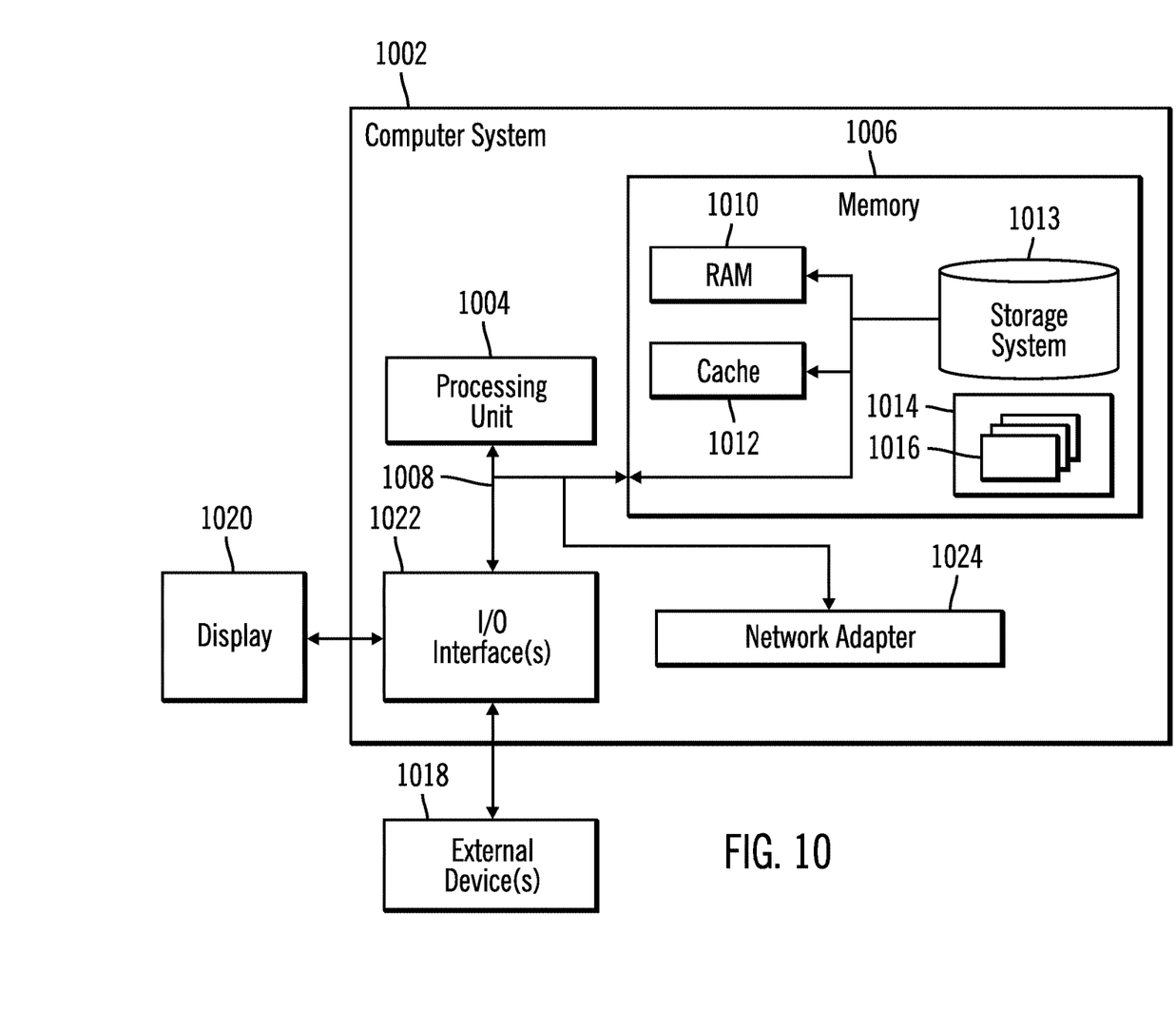
FIG. 10 illustrates a computing environment in which the components of FIG. 1 may be implemented.

The computational components of FIG. 1, including the storage controller 100, host 108, and processing nodes 200a, 200b, 200$_i$, device adaptors, and host adaptors may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining whether to accept a host request from a host system, comprising a computer readable storage medium having computer readable program code embodied therein that when executed performs operations, the operations comprising:

providing information related to running tasks, mail queue messages related to host requests, and the host request received from the host system indicating a priority of the host request and a type of the host request to a machine learning module, wherein the host request requires a task to be assigned to process the type of the host request;

receiving, from the machine learning module, an output representing an impact of processing the host request on system performance;

assigning a task to process the host request in response to the output falling below a first threshold indicating a low impact on the system performance of processing the host request; and returning busy to the host system for the host request in response to the output exceeding a second threshold indicating a high impact on the system performance of processing the host request.

2. The computer program product of claim 1, wherein the operations further comprise:

in response to determining that the output is between the first threshold and the second threshold, processing the host request and returning a throttle message to the host system to cause the host system to reduce a rate at which the host system sends requests.

3. The computer program product of claim 1, wherein the mail queue messages are between a host adaptor receiving host requests and a processing system including the machine learning module, wherein the processing system performs the providing the information, the receiving the output, assigning the task, and the returning busy.

4. The computer program product of claim 1,
wherein the information related to the running tasks comprises at least one of a number of short duration tasks running, a number of long duration tasks running, and current processor resource usage, and a number of available tasks;
wherein the information related to mail queue messages comprises a number of queued mail messages; and
wherein the information provided to the machine learning module further comprises information related to I/O request processing comprising at least one of a number of disconnected I/O operations in which the host system disconnects from a channel on which I/O requests are sent, a number of host re-driven I/O operations after disconnecting from the channel, and a number of I/O operations on the channel.

5. The computer program product of claim 1, wherein the information related to at least one of the running tasks and the mail queue messages are related to host requests from multiple host systems communicating host requests over a channel path.

6. The computer program product of claim 1, wherein the operations of the providing the information, the receiving the output, the assigning the task, and the returning busy are performed in response to receiving each host request from a host system to determine whether to process the host request or return busy to the host system for the host request.

7. A system for determining whether to accept a host request from a host system, comprising:
a processor; and
a computer readable storage medium having computer readable program code embodied therein that when executed by the processor performs operations, the operations comprising:
providing information related to running tasks, mail queue messages related to host requests, and the host request received from the host system indicating a priority of the host request and a type of the host request to a machine learning module, wherein the host request requires a task to be assigned to process the type of the host request;
receiving, from the machine learning module, an output representing an impact of processing the host request on system performance;
assigning a task to process the host request in response to the output falling below a first threshold indicating a low impact on the system performance of processing the host request; and
returning busy to the host system for the host request in response to the output exceeding a second threshold indicating a high impact on the system performance of processing the host request.

8. The system of claim 7, wherein the operations further comprise:
in response to determining that the output is between the first threshold and the second threshold, processing the host request and returning a throttle message to the host system to cause the host system to reduce a rate at which the host system sends requests.

9. The system of claim 7, wherein the mail queue messages are between a host adaptor receiving host requests and a processing system including the machine learning module, wherein the processing system performs the providing the information, the receiving the output, assigning the task, and the returning busy.

10. The system of claim 7,
wherein the information related to the running tasks comprises at least one of a number of short duration tasks running, a number of long duration tasks running, and current processor resource usage, and a number of available tasks;
wherein the information related to mail queue messages comprises a number of queued mail messages; and
wherein the information provided to the machine learning module further comprises information related to I/O request processing comprising at least one of a number of disconnected I/O operations in which the host system disconnects from a channel on which I/O requests are sent, a number of host re-driven I/O operations after disconnecting from the channel, and a number of I/O operations on the channel.

11. The system of claim 7, wherein the information related to at least one of the running tasks and the mail queue messages are related to host requests from multiple host systems communicating host requests over a channel path.

12. The system of claim 7, wherein the operations of the providing the information, the receiving the output, the assigning the task, and the returning busy are performed in response to receiving each host request from a host system to determine whether to process the host request or return busy to the host system for the host request.

13. A method for determining whether to accept a host request from a host system, comprising:
providing information related to running tasks, mail queue messages related to host requests, and the host request received from the host system indicating a priority of the host request and a type of the host request to a machine learning module, wherein the host request requires a task to be assigned to process the type of the host request;
receiving, from the machine learning module, an output representing an impact of processing the host request on system performance;
assigning a task to process the host request in response to the output falling below a first threshold indicating a low impact on the system performance of processing the host request; and
returning busy to the host system for the host request in response to the output exceeding a second threshold indicating a high impact on the system performance of processing the host request.

14. The method of claim 13, further comprising:
in response to determining that the output is between the first threshold and the second threshold, processing the host request and returning a throttle message to the host system to cause the host system to reduce a rate at which the host system sends requests.

15. The method of claim 13, wherein the mail queue messages are between a host adaptor receiving host requests and a processing system including the machine learning module, wherein the processing system performs the providing the information, the receiving the output, assigning the task, and the returning busy.

16. The method of claim 13,
wherein the information related to the running tasks comprises at least one of a number of short duration tasks running, a number of long duration tasks running, and current processor resource usage, and a number of available tasks;
wherein the information related to mail queue messages comprises a number of queued mail messages; and wherein the information provided to the machine learning module further comprises information related to I/O request processing comprising at least one of a number of disconnected I/O operations in which the host system disconnects from a channel on which I/O requests are sent, a number of host re-driven I/O operations after disconnecting from the channel, and a number of I/O operations on the channel.

17. The method of claim 13, wherein the information related to at least one of the running tasks and the mail queue messages are related to host requests from multiple host systems communicating host requests over a channel path.

18. The method of claim 13, wherein the providing the information, the receiving the output, the assigning the task, and the returning busy are performed in response to receiving each host request from a host system to determine whether to process the host request or return busy to the host system for the host request.

* * * * *